United States Patent
Nakazawa et al.

(10) Patent No.: US 9,956,524 B2
(45) Date of Patent: May 1, 2018

(54) VACUUM PUMP WITH ABATEMENT FUNCTION

(71) Applicant: EBARA CORPORATION, Tokyo (JP)

(72) Inventors: Toshiharu Nakazawa, Tokyo (JP); Tetsuro Sugiura, Tokyo (JP); Kohtaro Kawamura, Tokyo (JP); Toyoji Shinohara, Tokyo (JP); Takashi Kyotani, Tokyo (JP); Keiichi Ishikawa, Tokyo (JP); Seiji Kashiwagi, Tokyo (JP); Yasuhiko Suzuki, Tokyo (JP); Hideo Arai, Tokyo (JP)

(73) Assignee: Ebara Corporation, Tokyo (JP)

( * ) Notice: Subject to any disclaimer, the term of this patent is extended or adjusted under 35 U.S.C. 154(b) by 786 days.

(21) Appl. No.: 14/289,575

(22) Filed: May 28, 2014

(65) Prior Publication Data

US 2014/0352820 A1 Dec. 4, 2014

(30) Foreign Application Priority Data

May 30, 2013 (JP) ................................. 2013-114275

(51) Int. Cl.
*B01D 53/74* (2006.01)
*B01D 53/00* (2006.01)

(52) U.S. Cl.
CPC ............ *B01D 53/74* (2013.01); *B01D 53/005* (2013.01); *B01D 2257/204* (2013.01); *B01D 2257/2066* (2013.01); *B01D 2257/553* (2013.01); *B01D 2258/0216* (2013.01); *Y10T 137/85978* (2015.04)

(58) Field of Classification Search
None
See application file for complete search history.

(56) References Cited

U.S. PATENT DOCUMENTS

2009/0216061 A1* 8/2009 Clark .................. B01D 53/005
588/313
2010/0071548 A1 3/2010 Smith
(Continued)

FOREIGN PATENT DOCUMENTS

EP 2811161 A1 12/2014
JP 3305566 B2 5/2002
(Continued)

OTHER PUBLICATIONS

Mitani, H. JP2004200364A—translated document. (2004).*
(Continued)

*Primary Examiner* — Walter D. Griffin
*Assistant Examiner* — Jelitza M Perez
(74) *Attorney, Agent, or Firm* — Baker & Hostetler LLP

(57) ABSTRACT

A vacuum pump with abatement function is used for evacuating a chamber of a manufacturing apparatus. The vacuum pump with abatement function includes a vacuum pump having a discharge port to which one or more abatement parts for treating an exhaust gas discharged from the vacuum pump to make the exhaust gas harmless are attached. The one or more abatement parts are selected, depending on the amount and kind of the exhaust gas discharged from the vacuum pump, from plural kinds of abatement parts which have different treatment types of exhaust gas and/or different treatment amounts of exhaust gas.

9 Claims, 10 Drawing Sheets

(56) References Cited

U.S. PATENT DOCUMENTS

2011/0226874 A1\* 9/2011 Olander ................. F17C 11/00
 239/398
2012/0090338 A1 4/2012 Czerniak et al.

FOREIGN PATENT DOCUMENTS

| JP | 2004200364 A | \* | 7/2004 | | |
|----|----|----|----|----|----|
| JP | 2006-275421 A | | 10/2006 | | |
| JP | 2007-014937 A | | 1/2007 | | |
| JP | 2012-054541 A | | 3/2012 | | |
| TW | 201212096 A | | 3/2012 | | |
| WO | WO 2009/147426 A1 | | 12/2009 | | |
| WO | WO 2012/017972 A1 | | 2/2012 | | |
| WO | WO 2012017972 A1 | \* | 2/2012 | ........... | B01D 53/005 |

OTHER PUBLICATIONS

European Application No. 14170056.7; Extended European Search Report; dated Mar. 9, 2015; 8 pages.
European Application No. 14170056.7; Search Report; dated Oct. 27, 2014; 5 pages.

\* cited by examiner

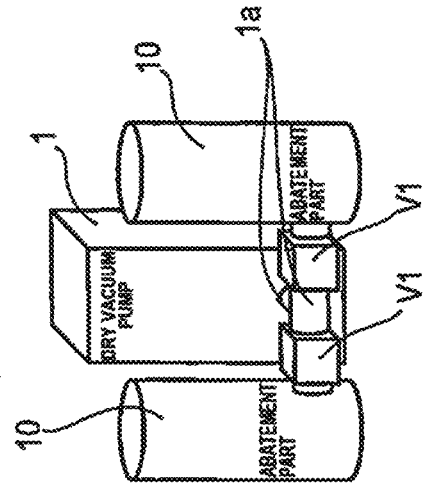
FIG. 2B
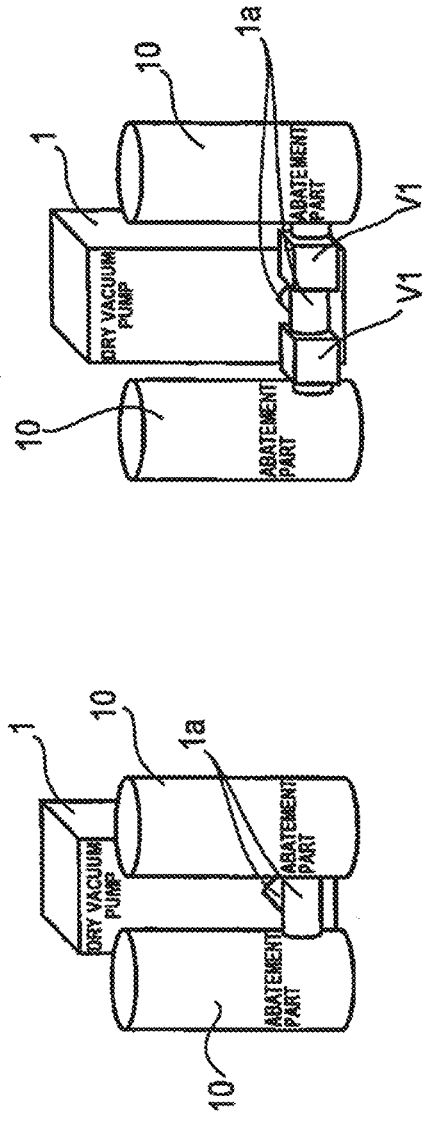
FIG. 2A
FIG. 2C
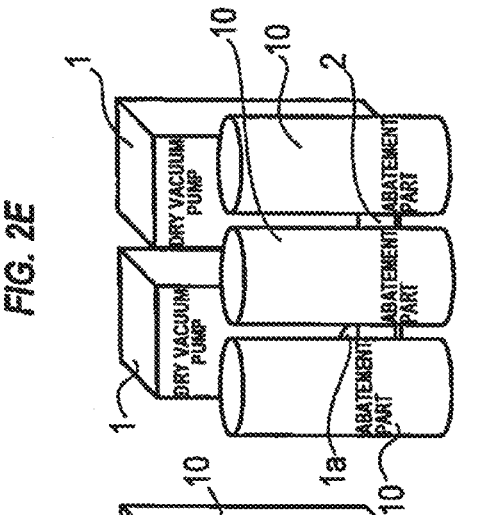
FIG. 2E
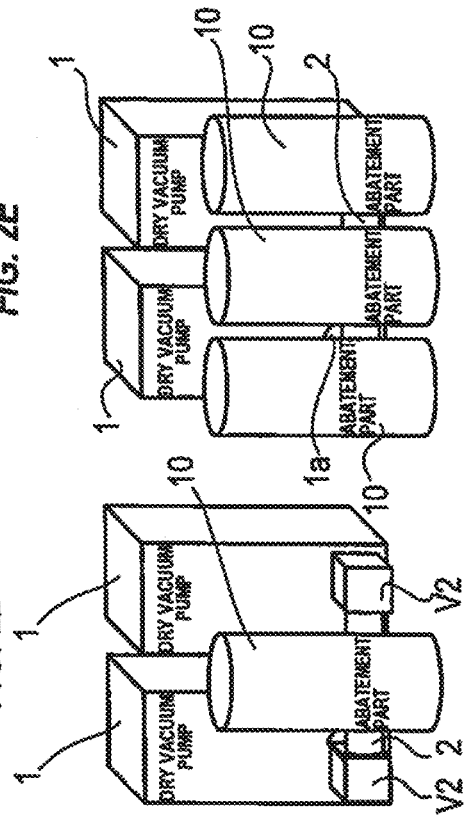
FIG. 2D
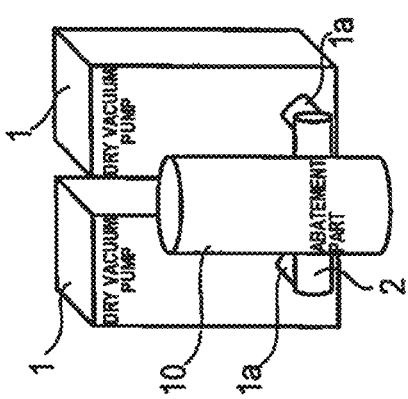

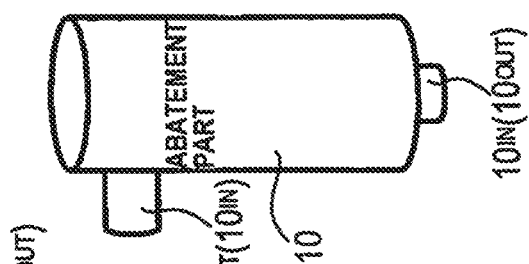
FIG. 5B
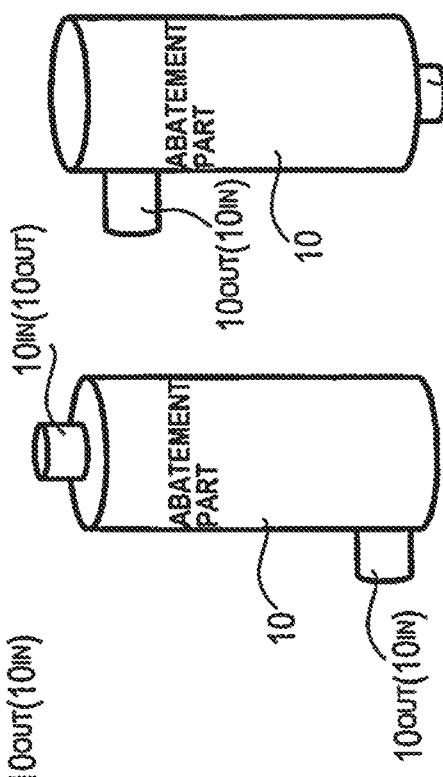
FIG. 5A
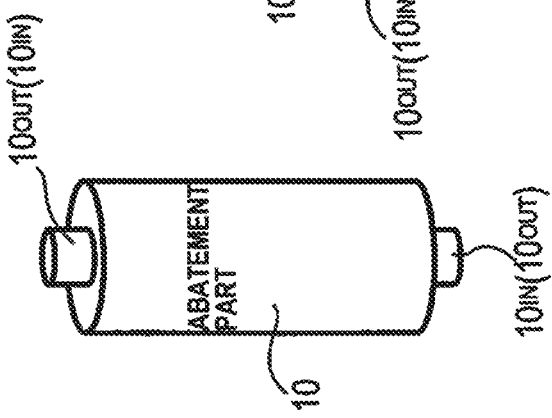
FIG. 5D    FIG. 5C
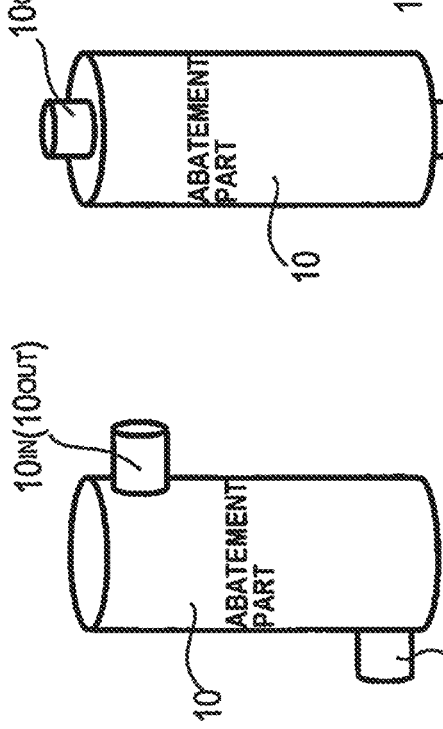
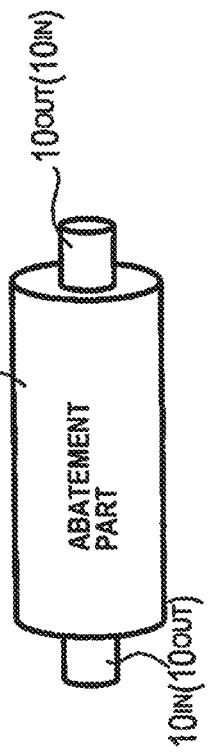
FIG. 5E

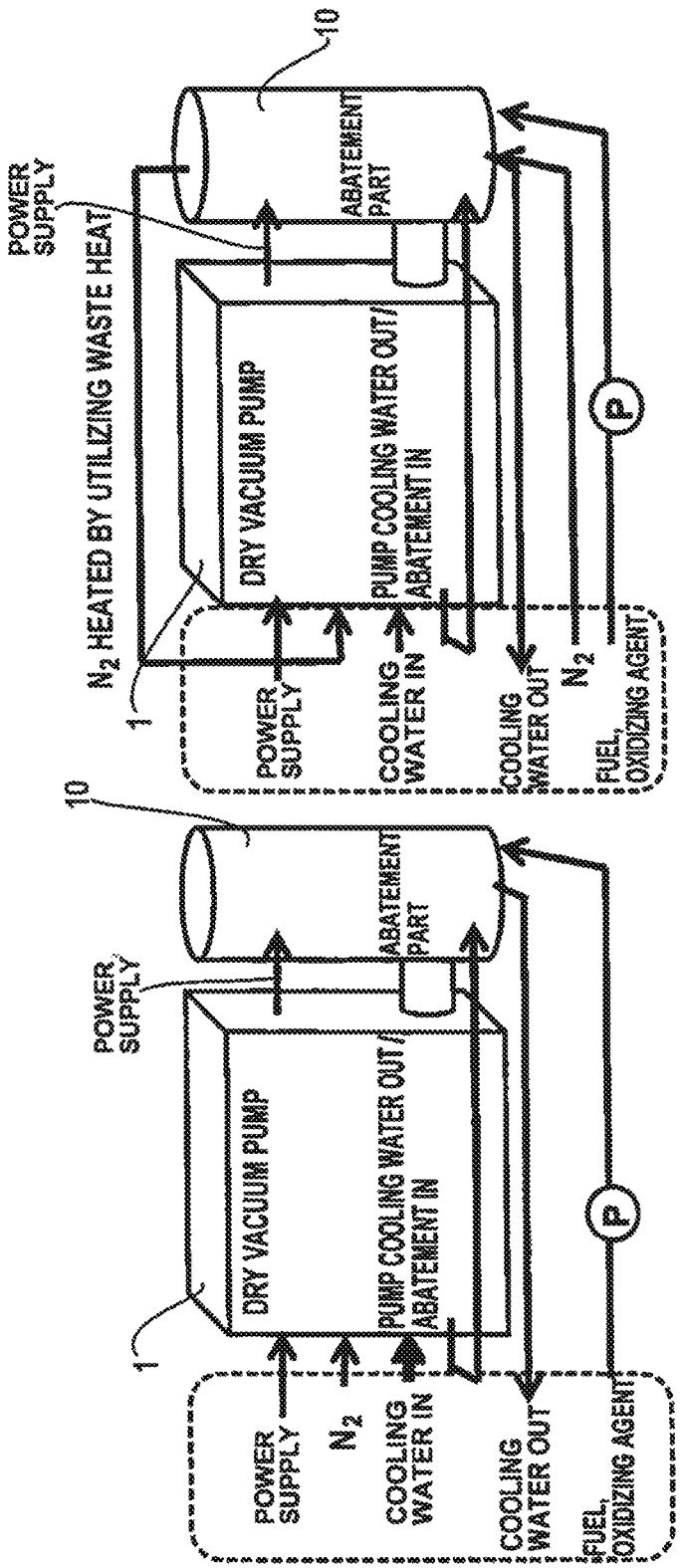

VACUUM PUMP WITH ABATEMENT FUNCTION

CROSS REFERENCE TO RELATED APPLICATION

This application claims priority to Japanese Patent Application No 2013-114275 filed May 30, 2013, the entire contents of which are hereby incorporated by reference.

BACKGROUND

In a manufacturing process for manufacturing semiconductor devices, liquid crystal panels, LEDs, solar cells or the like, a process gas is introduced into a process chamber which is being evacuated to perform various processes such as an etching process, a CVD process or the like. The process chamber for performing various processes such as an etching process, a CVD process or the like is evacuated by a vacuum pump. Further, the process chamber and exhaust apparatuses connected to the process chamber are cleaned periodically by supplying a cleaning gas thereto. Because exhaust gases such as the process gas, the cleaning gas or the like contain a silane-based gas ($SiH_4$, TEOS or the like), a halogen-based gas ($NF_3$, $ClF_3$, $SF_6$, $CHF_3$ or the like), a PFC gas ($CF_4$, $C_2F_6$ or the like) or the like, such exhaust gases have negative effects on human bodies and on the global environment such as global warming. Therefore, it is not preferable that these exhaust gases are emitted to the atmosphere as they are. Accordingly, these exhaust gases are made harmless by an exhaust gas treatment apparatus provided at a downstream side of the vacuum pump, and the harmless exhaust gases are emitted to the atmosphere.

In a manufacturing process for manufacturing semiconductor devices, liquid crystal panels, LEDs, solar cells or the like, various process gases, a cleaning gas and the like are used. The exhaust gas treatment apparatus for treating exhaust gases such as various process gases and a cleaning gas, has the following problems.

1) Specifications of the exhaust gas treatment apparatuses are prepared for respective customers and respective processes depending on the kinds (reactions) of the gases and the gas flow rates to be used in the semiconductor manufacturing processes, and the exhaust gas treatment apparatuses are evaluated and then brought to the market. In this case, in order to treat the exhaust gas to an allowable concentration or smaller, a treatment part, a cooling part, a powder collection part and the like are customized (modified depending on the specifications). Therefore, the exhaust gas treatment apparatuses need to be designed, manufactured and evaluated, for respective customers and respective manufacturing processes, thus requiring a great deal of labor and increasing an apparatus cost.

2) A process apparatus generally comprises one or more process chambers, and one or more dry vacuum pumps are connected to each process chamber, and then respective exhaust lines of the dry vacuum pumps are connected to the exhaust gas treatment apparatus. Therefore, the exhaust gas treatment apparatus needs to treat exhaust gases from the plural process chambers. Since the respective plural process chambers differ in recipes, the kinds of gases to be used and the timing of inflow of the gas differ in the respective process chambers. Accordingly, when taking into consideration the kind of gas and the pattern of the amount of gas to be introduced into the exhaust gas treatment apparatus, innumerable combinations can exist. The exhaust gas treatment apparatus having treatment performance which can deal with all these combinations is demanded, resulting in excessive performance (over-engineering).

3) Since the exhaust gases are introduced into the exhaust gas treatment apparatus from the process apparatus operated by using plural chambers, the treatment capacity of the exhaust gas treatment apparatus depends on the use conditions. Therefore, it is necessary to select hardware settings, utility settings and software settings of the exhaust gas treatment apparatus to fit the use conditions or to cover the assumed use conditions, and thus it is difficult to cope with change of the recipe and change of the process flexibly and promptly.

4) It is common for the specifications of the exhaust gas treatment apparatus to collectively treat exhaust gases from the plural chambers by the single abatement apparatus, and thus the exhaust gas treatment apparatus inevitably becomes large in size. In many cases, the large exhaust gas treatment apparatus is installed at a place apart from the dry vacuum pump by a certain distance due to limitations of the installation place in the factory. In a process in which a product is generated, if an exhaust line is long, the product is liable to accumulate. Therefore, maintenance of the exhaust line is necessary to affect downtime of the process apparatus. The accumulation of the product increases back pressure of the dry vacuum pump and causes a pump trouble.

5) In order to suppress the generation of sublimation product, it is necessary to install a heater on a pipe of the exhaust line, thus affecting an initial cost, a running cost, and the installment work time of the heater. The restoration of the heater at the time of the maintenance of the exhaust line also affects a process downtime.

6) The heater installed on the pipe generally employs a jacket-type heater which has a heater coil therein. The monitoring of the temperature necessary for controlling the heater is performed by a thermocouple provided on the heater coil or on a surface of a piece of an object to be heated. Since the unevenness of temperature distribution of the object to be heated cannot be avoided by single-point temperature control, in order to make the temperature distribution as uniform as possible, a large amount of design work such as feedback of measured results or re-manufacturing is required. Further, when the heater is installed on a long pipe, segmentation of the heater or the like is generally necessary to make the temperature distribution uniform, and thus complex individual control and complex wiring of the segmentalized heater are required. Consequently, an increase of labor of installation work, an increase of the initial cost and the like are caused.

7) The dry vacuum pomp for exhausting the process chamber and the exhaust gas treatment apparatus are individually controlled. Specifically, ON/OFF of the operation, switching of a combustion mode, interlock and the like are performed by exchanging signals individually between the dry vacuum pump and the manufacturing apparatus and between the exhaust gas treatment apparatus and the manufacturing apparatus. Accordingly, input and output signals need to be controlled with respect to each of the dry vacuum pump and the exhaust gas treatment apparatus. Further, the monitoring of the dry vacuum pump and the exhaust gas treatment apparatus is performed individually to control the operations of the dry vacuum pump and the exhaust gas treatment apparatus. Therefore, when protocols which work in conjunction with the manufacturing apparatus are constructed in each of the dry pump and the exhaust gas treatment apparatus, the manufacturing apparatus needs not only complex control hardware/software design but also complexly constructed wiring, thus causing an increase of design man-hours of the manufacturing apparatus. As a result, not only the initial cost but also verification time increases.

SUMMARY OF THE INVENTION

It is therefore an object to provide a vacuum pump with abatement function having an abatement part which is unnecessary to be customized (modified depending on specifications) for treating an exhaust gas to an allowable concentration or smaller, and thus can significantly shorten the design time and the verification time to reduce the lead time and can satisfy the minimum specifications in accordance with the safe allowable concentration at the minimum initial cost and the minimum running cost.

Embodiments, which will be described below, relate to a vacuum pump for use in an exhaust system of a manufacturing apparatus for manufacturing semiconductor devices, liquid crystal panels, LEDs, or the like, and more particularly to a vacuum pump with abatement function which comprises a vacuum pump, for evacuating a chamber of the manufacturing apparatus, to which an abatement function for treating an exhaust gas discharged from the chamber to make the exhaust gas harmless is added.

In order to achieve the above object, in an embodiment, there is provided a vacuum pump with abatement function comprising: a vacuum pump having a discharge port to which one or more abatement parts for treating an exhaust gas discharged from the vacuum pump to make the exhaust gas harmless are attached; wherein the one or more abatement parts are selected, depending on the amount and kind of the exhaust gas discharged from the vacuum pump, from plural kinds of abatement parts which have different treatment types of exhaust gas and/or different treatment amounts of exhaust gas.

According to the embodiment, the plural kinds of the abatement parts having different treatment types of exhaust gas are prepared, and the plural abatement parts having different treatment amounts of exhaust gas in each of the abatement parts having different treatment types of exhaust gas are prepared. An optimal abatement part is selected, depending on the amount and kind of the exhaust gas discharged from the vacuum pump, from the plural kinds of abatement parts and/or the plural abatement parts having different treatment amounts of exhaust gas, and the selected abatement part is integrated with the vacuum pump. Therefore, the abatement part is unnecessary to be customized (modified depending on specifications) in order to treat the exhaust gas to the allowable concentration or smaller, and the design time and the verification time can be shortened significantly, thus contributing to reduction of the lead time. Further, combined configuration determined by the kinds and the number of the abatement parts can be tailored to the use conditions.

In an embodiment, the vacuum pump comprises a single vacuum pump or a plurality of vacuum pumps connected in series and/or in parallel.

According to the embodiment, the vacuum pump may comprise a single dry vacuum pump or a plurality of dry vacuum pumps connected in series or in parallel. The one or more dry vacuum pumps comprise a roots-type dry vacuum pump, a screw-type dry vacuum pump, a claw-type dry vacuum pump, a scroll-type dry vacuum pump, or the like.

In an embodiment, the one or more abatement parts comprise a single abatement part or a plurality of abatement parts connected in series and/or in parallel.

According to the embodiment, one or more vacuum pumps and one or more abatement parts are connected. According to the embodiment, the plural abatement parts are connected in combination of series and/or parallel to form a group of abatement parts which can cope with various kinds of process demands and complex process demands. The plural abatement parts may be connected in combination of the plural kinds of the abatement parts such as a combustion-type, a dry type, a wet-type and a fixing-type, or in combination of the plural abatement parts of a single kind, depending on the amount and kinds of the exhaust gas.

In an embodiment, a common utility facility is configured to supply cooling water and/or an inert gas to the vacuum pump and the one or more abatement parts.

According to the embodiment, since the common utility facility is capable of supplying cooling water and/or inert gas to the vacuum pump and the abatement part, lines at the utility side can be simplified. Therefore, the design man-hours (hard/soft) can be reduced. Further, since it is not necessary to ensure utility lines for the abatement part, the utility planning can be simplified to reduce the initial cost. Furthermore, the management of the utility status in the abatement part and the vacuum pump can be performed by a single monitor to facilitate operational management.

In an embodiment, the inert gas is heated by using heat generated by the abatement treatment of the exhaust gas in the abatement part, and the heated inert gas is supplied to the vacuum pump.

According to the embodiment, waste heat generated by abatement treatment of the exhaust gas in the abatement part is utilized to heat the inert gas such as $N_2$, and the heated inert gas is supplied to the vacuum pump. Therefore, purging of the vacuum pump can be performed by the heated inert gas, and thus the product can be prevented from being attached to the interior of the vacuum pump. According to the embodiment, it is not necessary to install a dedicated heater for heating the inert gas, thus achieving the reduction of the design man-hours, the reduction of the lead time due to the reduced number of the parts, and the reduction of the cost. Further, power for heater is not necessary, and thus energy can be saved.

In an embodiment, the common utility facility is configured to supply fuel and air to the abatement part of a combustion-type.

In an embodiment, the common utility facility is configured to supply the fuel from a portable cylinder.

In an embodiment, the exhaust gas is treated by the one or more abatement parts, and then the treated gas is discharged directly to an exhaust duct located at an installation site of the vacuum pump with abatement function.

In an embodiment, the exhaust gas is treated by the one or more abatement parts, and then the treated gas is discharged to a scrubber.

In an embodiment, a controller configured to collectively control the vacuum pump and the abatement part is provided.

According to the embodiment, since the controller is configured to collectively control the vacuum pump and the abatement part, it is not necessary to prepare interfaces from the manufacturing apparatus respectively for the vacuum pump and for the exhaust gas treatment apparatus unlike conventional manner. Since a main port for signals is provided in the vacuum pump, the control of the apparatus side or the factory side can be simplified. Since a pump controller controls the abatement part in accordance with the operation status of the vacuum pump, synchronous operation and safe operation, in accordance with the use conditions and use environment, of the abatement part and the vacuum pump can be realized. The operation mode of the abatement part can be optimized in accordance with the use status of the vacuum pump.

In an embodiment, there is provided an abatement part comprising: one or more abatement parts for treating an exhaust gas to make the exhaust gas harmless; and a controller configured to control the entirety of the one or more abatement parts; wherein the controller is configured to send and receive signals to and from a controller provided in an apparatus located at an installation site of the abatement part, and to output status signals of the one or more abatement parts to a monitoring system located at the installation site.

In the case where the abatement part of the embodiment is connected to an existing exhaust system equipped with a vacuum pump, in the case where the abatement part of the embodiment is brought to the market in which a vacuum pump is not necessary, or in other cases, the abatement part needs to be controlled alone. According to the embodiment, since the abatement part has a controller for controlling the entire abatement part, the stand-alone-type abatement part can be constructed. The stand-alone-type abatement part can be used in combination of a blower and the abatement part, or by the abatement part itself. Therefore, the abatement part can be used in the existing exhaust system equipped with the vacuum pump.

The above-described embodiments offer the following advantages.

(1) The plural kinds of the abatement parts having different treatment types of exhaust gas are prepared, and the plural abatement parts having different treatment amounts of exhaust gas in each of the abatement parts having different treatment types of exhaust gas are prepared. An optimal abatement part is selected, depending on the amount and kind of the exhaust gas discharged from the vacuum pump, from the plural kinds of abatement parts and/or the plural abatement parts having different treatment amounts of exhaust gas, and the selected abatement part is integrated with the vacuum pump. Therefore, the abatement part is unnecessary to be customized (modified depending on specifications) in order to treat the exhaust gas to the allowable concentration or smaller, and the design time and the verification time can be shortened significantly, thus contributing to reduction of the lead time. Further, combined configuration determined by the kinds and the number of the abatement parts can be tailored to the use conditions.

(2) Since the conventional exhaust gas treatment apparatus has been large in size, its transportation, installation, de-installation and relocation have not been easy and have required complex control. On the other hand, the abatement part of the embodiment has a small-sized and compact configuration and is comprised of a small number of parts, thus reducing a failure rate. In the case of failure, the abatement part can be replaced on site with a spare abatement part, and thus the process downtime can be reduced. In the case of maintenance, the abatement part can be replaced on site with a spare abatement part, and thus the process downtime can be reduced.

(3) The exhaust gas discharged from the vacuum pump has been heated by compression heat in the vacuum pump to a temperature of about 200° C., and the heated exhaust gas is introduced from the discharge pipe directly into the abatement part wherein the exhaust gas can be treated to be made harmless. Therefore, it is not necessary to heat the exhaust gas from normal temperature, and an amount of fuel used in the abatement part can be reduced, thus achieving energy saving. Since the exhaust gas heated to a temperature of about 200° C. flows through the discharge pipe of the vacuum pump, it is not necessary to heat the discharge pipe by a heater for piping. Therefore, it is not necessary to install the heater for piping, and thus energy saving can be achieved.

(4) Waste heat generated by abatement treatment of the exhaust gas in the abatement part is utilized to heat the inert gas such as $N_2$, and the heated inert gas is supplied to the vacuum pump. Therefore, purging of the vacuum pump can be performed by the heated inert gas, and thus the product can be prevented from being attached to the interior of the vacuum pump. According to the embodiment, it is not necessary to install a dedicated heater for heating the inert gas, thus achieving the reduction of the design man-hours, the reduction of the lead time due to the reduced number of the parts, and the reduction of the cost. Further, power for heater is not necessary, and thus energy can be saved.

(5) The plural abatement parts are connected in combination of series and/or parallel to form a group of abatement parts which can cope with various kinds of process demands and complex process demands. The plural abatement parts may be connected in combination of the plural kinds of the abatement parts such as a combustion-type, a dry-type, a wet-type and a fixing-type, or in combination of the plural abatement parts of a single kind, depending on the amount and kinds of the exhaust gas. By providing the minimum specifications in accordance with the safe allowable concentration, the minimum initial cost and the minimum running cost can be achieved. By arranging the abatement pans in parallel, at the time of breakdown or maintenance of one abatement part, another abatement part can perform back-up operation to make the process downtime zero.

(6) Since a pump controller is configured to collectively control the vacuum pump and the abatement part, it is not necessary to prepare interfaces from the manufacturing apparatus respectively for the vacuum pump and for the exhaust gas treatment apparatus unlike conventional manner. Since a main port for signals is provided in the vacuum pump, the control of the apparatus side or the factory side can be simplified. Since the pump controller controls the abatement part in accordance with the operation status of the vacuum pump, synchronous operation and safe operation, in accordance with the use conditions and use environment, of the abatement part and the vacuum pump can be realized. The operation mode of the abatement part can be optimized in accordance with the use status of the vacuum pump.

BRIEF DESCRIPTION OF THE DRAWINGS

FIGS. 2A through 2E are schematic perspective views showing other configuration examples of vacuum pumps with abatement function according to an embodiment;

FIGS. 5A through 5E are schematic perspective views each showing a configuration example wherein an abatement part having a cylindrical container shape is installed vertically (FIGS. 5a through 5D) or laterally (FIG. 5E) and an exhaust gas inlet and an exhaust gas outlet of the abatement part are arranged in various directions so as to deal with various connecting forms;

FIGS. 7A and 7B are schematic views showing configurations of the commonalized utilities of the vacuum pump with abatement function according to an embodiment;

DETAILED DESCRIPTION OF EMBODIMENTS

Figure 1C:
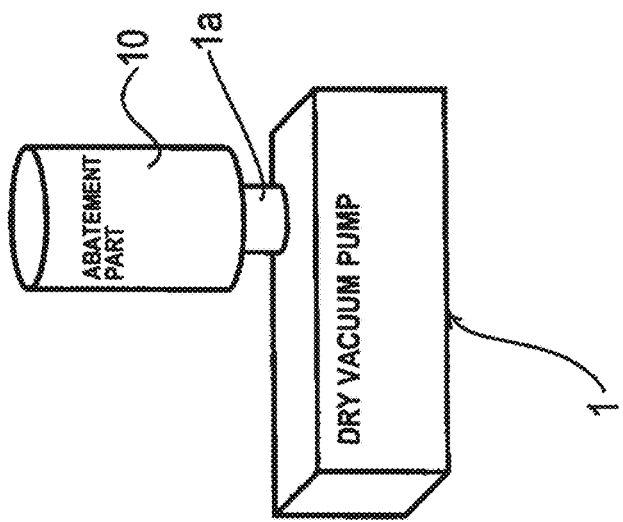
FIGS. 1A, 1B and 1C are schematic perspective views showing configuration examples of vacuum pumps with abatement function according to an embodiment.

A vacuum pump with abatement function according to embodiments will be described below with reference to FIGS. 1A through 10. In FIGS. 1A through 10, identical or corresponding parts are denoted by identical or corresponding reference numerals throughout views, and will not be described in duplication.

Figure 1B:
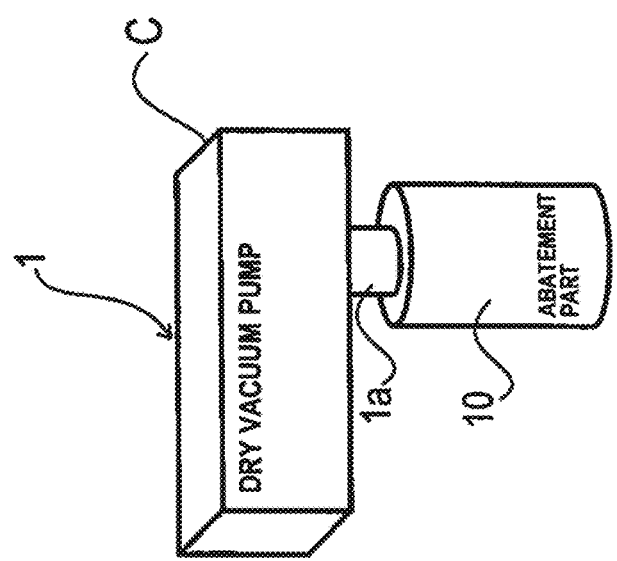
Figure 1A:
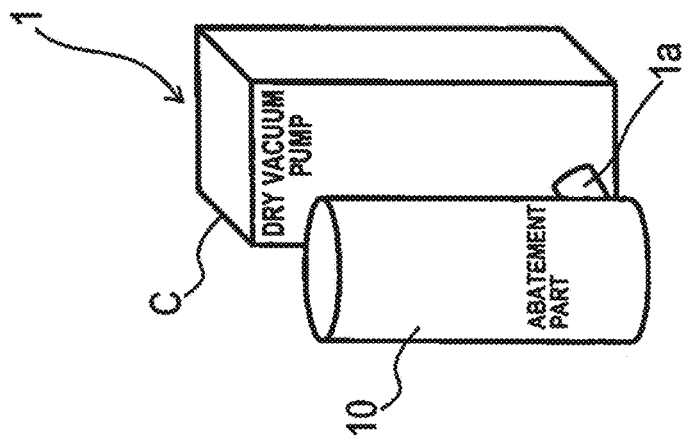

FIGS. 1A, 1B and 1C are schematic perspective views showing configuration examples of vacuum pumps with abatement function according to the embodiment.

As shown in FIGS. 1A, 1B and 1C, each of vacuum pumps with abatement function according to the embodiment has a configuration wherein an abatement part 10 is attached to a discharge pipe 1a of a vacuum pump 1. The vacuum pump 1 may comprise a single dry vacuum pump or a plurality of dry vacuum pumps connected in series or in parallel. The one or more dry vacuum pumps comprise a roots-type dry vacuum pump, a screw-type dry vacuum pump, a claw-type dry vacuum pump, a scroll-type dry vacuum pump, or the like, which is well known in the art and will not be shown and described in detail below. In FIGS. 1A, 1B and 1C, each of the vacuum pumps 1 is illustrated as a vacuum pump having a housing C. The abatement part 10 is composed of a cylindrical container as a whole. When each of the abatement parts is connected to the city pump, a controller of the dry pump automatically recognizes the kind of the abatement part.

In FIGS. 1A, 1B and 1C, the arrangement relations between the vacuum pumps 1 and the abatement parts 10 differ from each other. In FIG. 1A, the vacuum pump 1 and the abatement part 10 are juxtaposed. In FIG. 1B, the abatement part 10 is arranged below the vacuum pump 1. In FIG. 1C, the abatement part 10 is arranged above the vacuum pump 1. In FIGS. 1A, 1B and 1C, the kinds of the abatement parts 10 include a combustion-type, a dry-type, a wet-type, a heater-type, a fluorine-fixing-type, a catalytic-type, a plasma-type, and a dilution-unit-type (a blower, $N_2$ adding, air adding). In the embodiment, these plural kinds of the abatement parts 10 employing different treatment types of exhaust gas are prepared. Further, a plurality of abatement parts 10 having different treatment amounts of exhaust gas in each of the abatement parts 10 employing different treatment types of exhaust gas are prepared. In the embodiment, an optimal abatement part 10 is selected, depending on the amount and kind of the exhaust gas discharged from the vacuum pump 1, from the plural kinds of abatement parts 10, and/or the plural abatement parts 10 having different treatment amounts of exhaust gas, and the selected abatement part 10 is integrated with the vacuum pump 1.

In FIGS. 1A, 1B and 1C, the discharge pipe in which connects a discharge port of the vacuum pump 1 and a gas introduction port of the abatement part 10 has a piping length of not more than 500 mm, specifically 200 mm to 400 mm. Further, the diameter of the discharge port of the discharge pipe 1a is not less than 15 mm in consideration of the back pressure of the dry vacuum pump, specifically 16 mm to 40 mm. The abatement part 10 may be connected directly to a discharge portion of the vacuum pump 1, without providing the discharge pipe 1a.

FIGS. 2A through 2E are schematic perspective views showing other configuration examples of vacuum pumps with abatement function according to the embodiment.

FIGS. 2A and 2B each shows a vacuum pump with abatement function having a configuration wherein two abatement parts 10, 10 are attached to respective portions branched from a discharge pipe 1a of the vacuum pump 1. In the example shown in FIG. 2A, the branched portions of the discharge pipe 1a are connected directly to the two abatement parts 10, 10. In the example shown in FIG. 2B, by providing an automatically-operated valve (or manually-operated valve) V1 on each of the branched portions of the discharge pipe 1a, the inflow of the exhaust gas to each of the abatement parts 10, 10 can be controlled.

FIGS. 2C and 2D each shows a vacuum pump with abatement function having a configuration wherein discharge pipes 1a, 1a of two vacuum pumps 1, 1 are connected by a manifold 2 and a single abatement part 10 is attached to the manifold 2.

In the example shown in FIG. 2C, the manifold 2 and the abatement part 10 are connected to each other. In the example shown in FIG. 2D, by providing two automatically-operated valves (or manually-operated valves) V2, V2 on the manifold 2, the inflow of the exhaust gas from each of the vacuum pumps 1, 1 to the abatement part 10 can be controlled.

FIG. 2E shows a vacuum pump with abatement function having a configuration wherein discharge pipes 1a, 1a of two vacuum pumps 1, 1 are connected by a manifold 2 and three abatement parts 10 are attached to the manifold 2.

As shown in FIGS. 1A through 2E, according to the embodiment, since the compact abatement part (or parts) 10 is provided directly on the discharge port (or ports) of one or plural vacuum pumps 1a to construct an integrated unit, it is not necessary to consider a conventional design such as a storage rack for housing one or plural exhaust gas treatment apparatuses and one or plural dry vacuum pumps. As a result, the design time and the verification time can be shortened significantly, thus contributing to reduction of the lead time. Further, in the abatement part 10, by performing each module design, the design time necessary for designing a single abatement part can be shortened. Furthermore, the combined configuration determined by the kinds and the number of the abatement parts 10 can be tailored to the use conditions. Since the modularized abatement part is provided in each of the dry vacuum pumps (process chambers), flexible measures to cope with a load factor in each of the process chambers can be taken.

Since the development time of the abatement part 10 is shortened, the lead time is reduced. Since the products are standardized, a database of performance records or other records in each process can be easily constructed. Since the performance of respective abatement parts is clarified, the type of the abatement part and the suggestion of the abatement part can be facilitated.

Since the abatement part 10 has a simple configuration, the parts can be commonalized. Consequently, the manufacturing lead time and the manufacturing cost can be reduced.

Since the abatement parts 10 can be standardized, the respective abatement parts 10 can easily meet and follow the safety standards and guidelines.

Since the conventional exhaust gas treatment apparatus has been large in size, its transportation, installation, de-installation and relocation have not been easy and have required complex control. On the other hand, the abatement part 10 of the embodiment has a small-sized and compact configuration and is comprised of a small number of parts, thus reducing a failure rate. In the case of failure, the abatement part can be replaced on site with a spare abatement part, and thus the process downtime can be reduced.

Further, in the case of maintenance, the abatement part can be replaced on site with a spare abatement part, and thus the process downtime can be reduced. In the case of abnormality, only the abatement part 10 can be brought to the factory or service center and inspected there.

According to the embodiment, the exhaust gas discharged from the vacuum pump 1 has been heated by compression heat in the vacuum pump 1 to a temperature of about 200° C., and the heated exhaust gas is introduced from the discharge pipe 1a directly into the abatement part 10 wherein the exhaust gas can be treated to be made harmless by combustion. Therefore, it is not necessary to heat the exhaust gas from normal temperature, and an amount of fuel used in the abatement part 10 can be reduced, thus achieving energy saving. Since the exhaust gas heated to a temperature of about 200° C. flows through the discharge pipe 1a of the vacuum pump 1, it is not necessary to heat the discharge pipe 1a by a heater for piping. Therefore, it is not necessary to install the heater for piping, and thus energy saving can be achieved. Further, since the discharge pipe 1a which connects the vacuum pump 1 and the abatement part 10 has a piping length of not more than 500 mm, the product can be prevented from being attached to the discharge pipe 1a.

Figure 3:
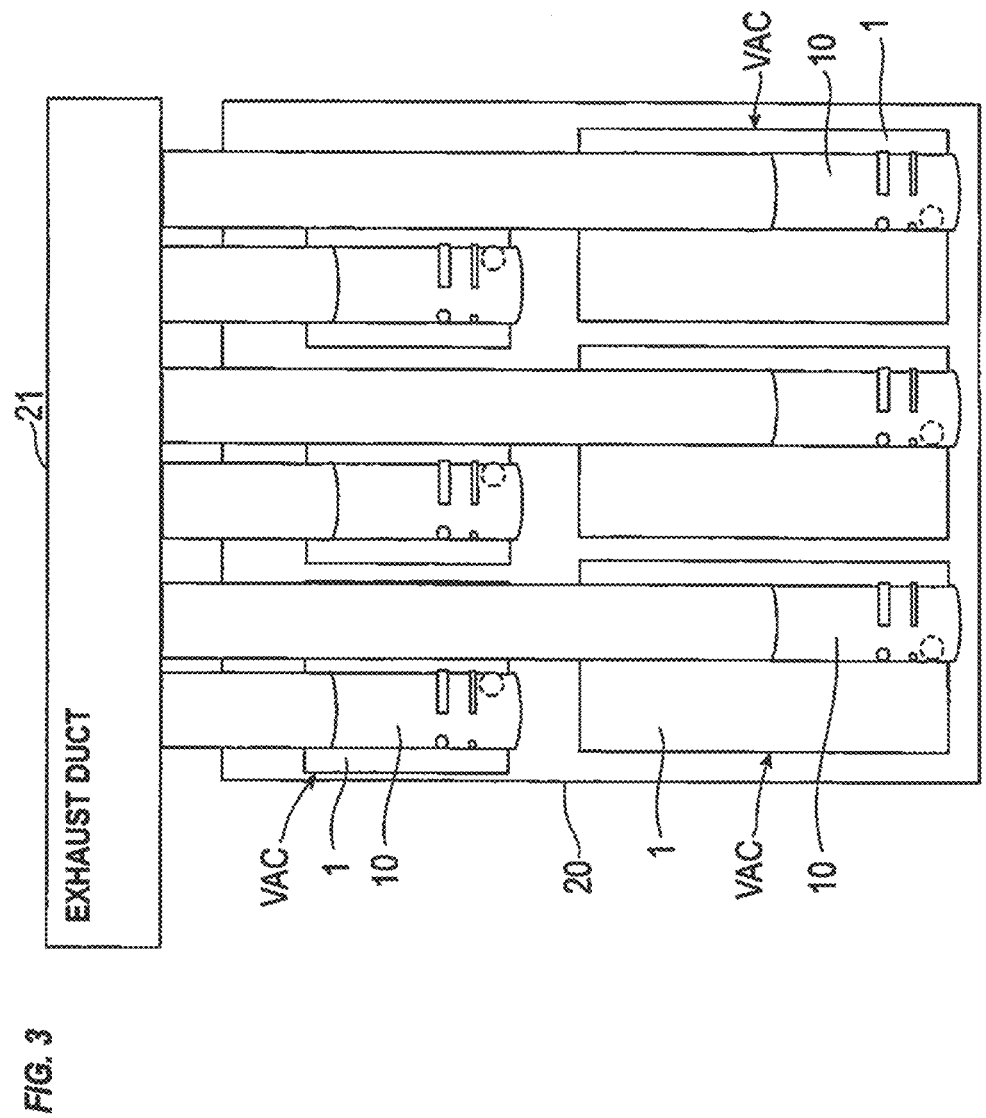
FIG. 3 is a schematic front view showing an example wherein a plurality of vacuum pumps with abatement function according to an embodiment are installed to evacuate a plurality of process chambers.

FIG. 3 is a schematic front view showing an example wherein a plurality of vacuum pumps with abatement function according to the embodiment are installed to evacuate a plurality of process chambers. In FIG. 3, a vacuum pump with abatement function, according to the embodiment, having a configuration wherein an abatement part 10 is attached to a discharge pipe 1a of a vacuum pump 1 is identified by using VAC. As shown in FIG. 3, the plural vacuum pumps VAC with abatement function are housed in a pump rack 20. By providing the minimum specifications of the abatement part 10 of the vacuum pump VAC in accordance with the safe allowable concentration, the minimum initial cost and the minimum running cost can be achieved. An outlet of the abatement part 10 of the vacuum pump VAC is connected directly to an exhaust duct 21 of the factory. Powder generated in the treatment by the abatement part 10 is blown of by flow velocity of the exhaust of the abatement part 10 and is then discharged to the exhaust duct 21.

Figure 4:
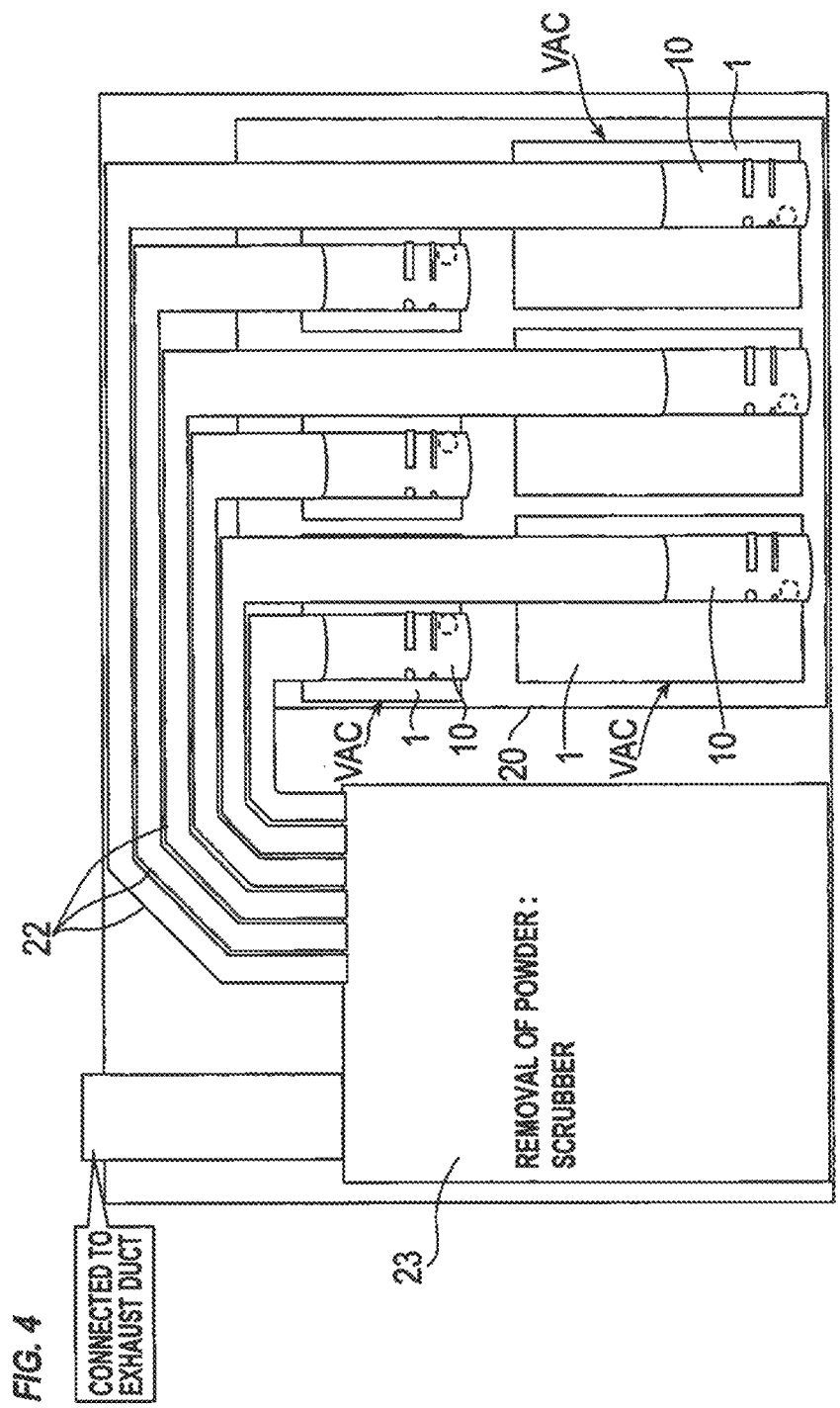
FIG. 4 is a schematic front view showing an example wherein a scrubber is installed in the case where powder generated in an abatement part of a vacuum pump cannot be discharged directly to an exhaust duct.

FIG. 4 is a schematic front view showing an example wherein a scrubber is installed in the case where the powder generated in the abatement part 10 of the vacuum pump VAC cannot be discharged directly to the exhaust duct 21. As shown in FIG. 4, outlets of the abatement parts 10 of the plural vacuum pumps VAC are connected to a scrubber 23 via connecting pipes 22. The scrubber 23 comprises a water scrubber, for example. An outlet of the scrubber 23 is connected to the exhaust duct 21 (see FIG. 3). A filter may be installed instead of the scrubber.

As shown in FIGS. 1A through 2E, the vacuum pump 1 and the abatement part 10 are connected to each other in a variety of arrangements. Further, one or more vacuum pumps 1 are connected to one or more abatement parts 10. Furthermore, according to the embodiment, there are cases where plural abatement parts 10 are connected in series or in parallel. Accordingly, the abatement part 10 used in the embodiment is required to have a configuration of an exhaust gas inlet $10_{IN}$ and an exhaust gas outlet $10_{OUT}$ capable of dealing with various connecting forms.

FIGS. 5A through 5E are schematic perspective views each showing a configuration example wherein an abatement part 10 having a cylindrical container shape is installed vertically (FIGS. 5a through 5D) or laterally (FIG. 5E) and an exhaust gas inlet $10_{IN}$ and an exhaust gas outlet $10_{OUT}$ of the abatement part 10 are arranged in various directions so as to deal with the various connecting forms. In the example shown in FIG. 5A, the inlet $10_{IN}$ (or outlet $10_{OUT}$) of the abatement part 10 is provided at an upper part of a side surface of the abatement part 10, and the outlet $10_{OUT}$ (or inlet $10_{IN}$) of the abatement part 10 is provided at a lower part of the side surface of the abatement part 10. In the example shown in FIG. 5B, the inlet $10_{IN}$ (or outlet $10_{OUT}$) of the abatement part 10 is provided at a lower surface of the abatement part 10, and the outlet $10_{OUT}$ (or inlet $10_{IN}$) of the abatement part 10 is provided at an upper surface of the abatement part 10. In the example shown in FIG. 5C, the inlet $10_{IN}$ (or outlet $10_{OUT}$) of the abatement part 10 is provided at the upper surface of the abatement part 10, and the outlet $10_{OUT}$ (or inlet $10_{IN}$) of the abatement part 10 is provided at the lower part of the side surface of the abatement part 10. In the example shown in FIG. 5D, the inlet $10_{IN}$ (or outlet $10_{OUT}$) of the abatement part 10 is provided at the lower surface of the abatement part 10, and the outlet $10_{OUT}$ (or inlet $10_{IN}$) of the abatement part 10 is provided at the upper part of the side surface of the abatement part 10. In the example shown in FIG. 5E, the inlet $10_{IN}$ of the abatement part 10 is provided at one lateral surface, and the outlet $10_{OUT}$ of the abatement part 10 is provided at the other lateral surface.

Figure 6B:
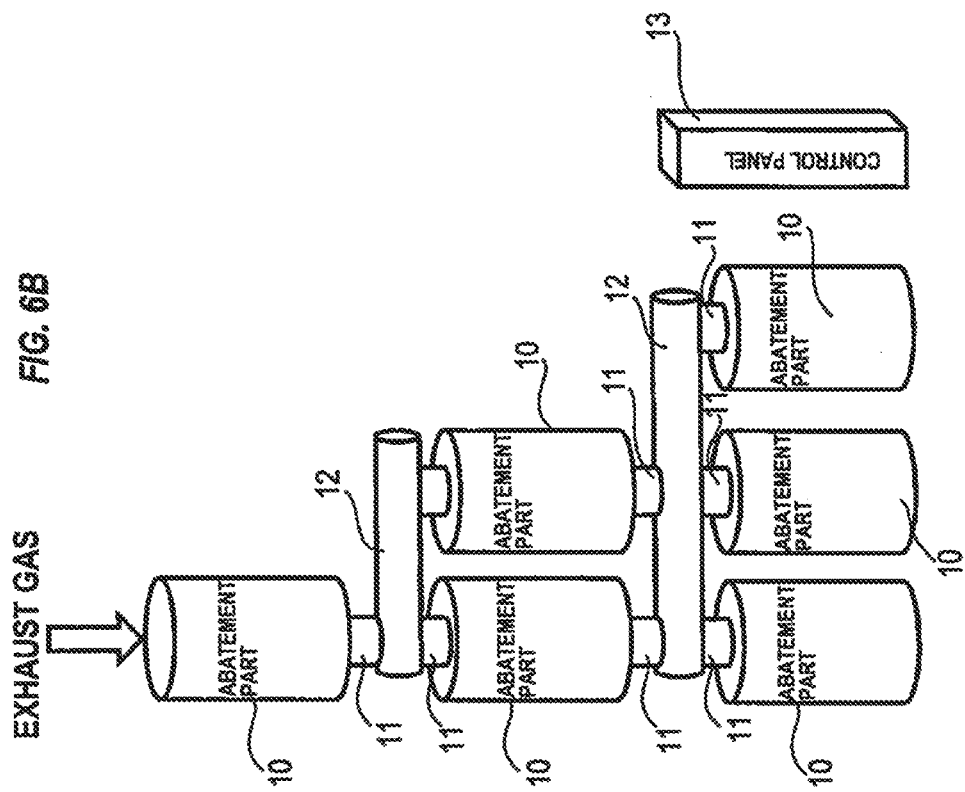
FIGS. 6A and 6B are schematic perspective views showing configurations wherein plural abatement parts are connected in series and/or in parallel so as to deal with the amount and kind of exhaust gas discharged from one or more vacuum pumps.
Figure 6A:
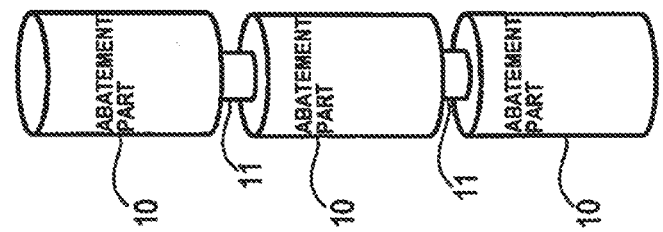

FIGS. 6A and 6B are schematic perspective views showing configurations wherein plural abatement parts 10 are connected in series and/or in parallel so as to deal with the amount and kind of the exhaust gas discharged from one or more vacuum pumps 1.

In the example shown in FIG. 6A, the plural (three as illustrated) abatement parts 10 are connected in series. The plural abatement parts 10 may be connected via a connecting pipe 11, or a gas outlet and a gas inlet of the two adjacent abatement parts 10 may be connected directly to each other without using the connecting pipe 11.

In the example shown in FIG. 6B, the plural abatement parts 10 are connected in series and in parallel via connecting pipes 11 and manifolds 12 so that the number of the abatement parts 10 increases gradually in the flow direction of the exhaust gas. Specifically, the abatement parts 10 are arranged in multiple stages from an upstream side toward a downstream side of the flow direction of the exhaust gas such that the number of the abatement parts 10 in respective stages increases so as to be one, two and three, and these abatement parts 10 are connected in series from the upstream side toward the downstream side. The plural abatement parts 10 in each stage are connected in parallel via the manifold 12.

As shown in FIGS. 6A and 6B, the plural abatement parts 10 are connected in combination of series and/or parallel to form a group of abatement parts which can cope with various kinds of process demands and complex process demands. The plural abatement parts 10 may be connected in combination of the plural kinds of the abatement parts 10 such as a combustion-type, a dry-type, a wet-type and a fixing-type, or in combination of the plural abatement parts of a single kind, depending on the amount and kinds of the exhaust gas.

By providing the minimum necessary specifications in accordance with the safe allowable concentration, the minimum initial cost and the minimum running cost can be achieved.

By arranging the abatement parts 10 in parallel, back-up operation can easily be performed. Specifically, at the time of breakdown or maintenance of one abatement part 10, another abatement part 10 can perform the back-up operation to make the process downtime zero.

Further, by installing the plural abatement parts 10 to perform an overhaul of the abatement part 10 concurrently with an overhaul of the vacuum pump 1, mutual hack-up operation can be performed.

In the case of a change of process specifications after installment of the abatement parts, modification of setting values in each abatement part can be made easily, and in some cases, only the modification of a specific abatement part is sufficient to deal with such change.

The design of the abatement part 10 itself is unnecessary or minimized, and only the layout consideration is sufficient. Further, since the abatement parts 10 are standardized for each level of required performance, modification parts can be manufactured easily. Further ore, the delivery time for the parts can be reduced and the modification procedure can be simplified.

Since every abatement part is designed to meet the standards, in the case of new required specifications, the consideration and acquisition of certification for the standards is not necessary. All the pipes are not necessary to be collecting pipes. If necessary, a valve may be provided on a piping portion. In the case where the plural abatement parts 10 are connected in series or in parallel, the installation place and direction of the abatement parts 10 can be set freely. Further, by combining one or more abatement parts 10 and a control panel 13, a stand-alone monolithic/composite abatement system can be constructed. Furthermore, auxiliary equipment may be added appropriately to the configuration shown in FIGS. 6A and 6B.

Next, utilities of the vacuum pump with abatement function according to the embodiment will be described. FIGS. 7A and 7B are schematic views showing configurations of the commonalized utilities of the vacuum pump with abatement function according to the embodiment.

In an example shown in FIG. 7A, power is supplied to the vacuum pump 1 and power for the abatement part 10 is supplied from the vacuum pump 1. The power may be supplied to the abatement part 10 from an interface box installed in the vacuum pump 1. Cooling water is supplied to the vacuum pump 1 to cool the vacuum pump, and then supplied to the abatement part 10 to cool the abatement part 10. The cooling water which has cooled the abatement part 10 is returned to a utility facility. In order to prevent a product from being attached to an interior of the vacuum pump 1, $N_2$ can be supplied from the utility facility to the vacuum pump 1. In the case where the abatement part 10 comprises a combustion-type abatement part, a fuel and an oxidizing agent can be supplied from the utility facility to the abatement part 10. The fuel and the oxidizing agent may be supplied from portable cylinders. In this case, the combustion-type abatement part can be operated in a place having no fuel supply line. The portable cylinders can be placed in a plurality of rows so that a used cylinder can be replaced during operation of the abatement part. In the case where the fuel and the oxidizing agent are supplied from the portable cylinders, pressure gages P may be provided to detect remaining amounts (or to monitor pressures) of the fuel and/or the oxidizing agent. In this case, when the remaining amount in the portable cylinder becomes lower than a certain amount, notification function by signal/lamp/sound may be performed.

In the example shown in FIG. 7B, in the case where the abatement part 10 comprises a combustion-type abatement part or a thermo-oxidative-type abatement part, $N_2$ is supplied from the utility facility to the abatement part 10, and waste heat generated by abatement treatment of the exhaust gas in the abatement part 10 is utilized to heat the $N_2$, and the heated $N_2$ is supplied to the vacuum pump 1. Therefore, purging of the vacuum pump 1 can be performed by the heated $N_2$ gas, and thus the product can be prevented from being attached to the interior of the vacuum pump 1. According to the embodiment, it is not necessary to install a dedicated heater for heating the $N_2$ gas, thus achieving the reduction of the design man-hours, the reduction of the lead time due to the minced number of the parts, and the reduction of the cost. Further, power for heater is not necessary, and thus energy can be saved. The purge gas may be an inert gas which does not react with the contained gases, other than $N_2$. For example, the purge gas may be a noble gas such as He, Ar or Kr, or $CO_2$.

Even if a sufficiently high temperature is not ensured by the waste heat, since the $N_2$ whose temperature has been raised to some extent can be supplied to the heater for hot $N_2$, a bad factor of the heater for hot $N_2$ can be reduced compared to the case of temperature rise from an ordinary temperature, thereby contributing to the reduction of necessary power consumption. In the example shown in FIG. 7B, other utilities such as power and cooling water are supplied as with the example shown in FIG. 7A.

As shown in FIGS. 7A and 7B, since the supply line of $N_2$ and the supply line of cooling water are configured respectively to connect the vacuum pump 1 and the abatement part 10 in series, the lines at the utility side can be simplified. Therefore, the design man-hours (hard/soft) can be reduced. Further, since it is not necessary to ensure utility lines for the abatement part 10, the utility planning can be simplified to reduce the initial cost. Furthermore, the management of the utility status in the abatement part 10 and the vacuum pump 1 can be performed by a single monitor to facilitate operational management.

Next, a configuration of a controller of a vacuum pump with abatement function of the embodiment will be described. Since the vacuum pump with abatement function of the embodiment comprises an integrated-type vacuum pump in which one or more abatement parts 10 are attached to one or more vacuum pumps 1, a controller provided in the vacuum pump 1 is configured to perform overall control of the vacuum pump with abatement function.

Figure 8:
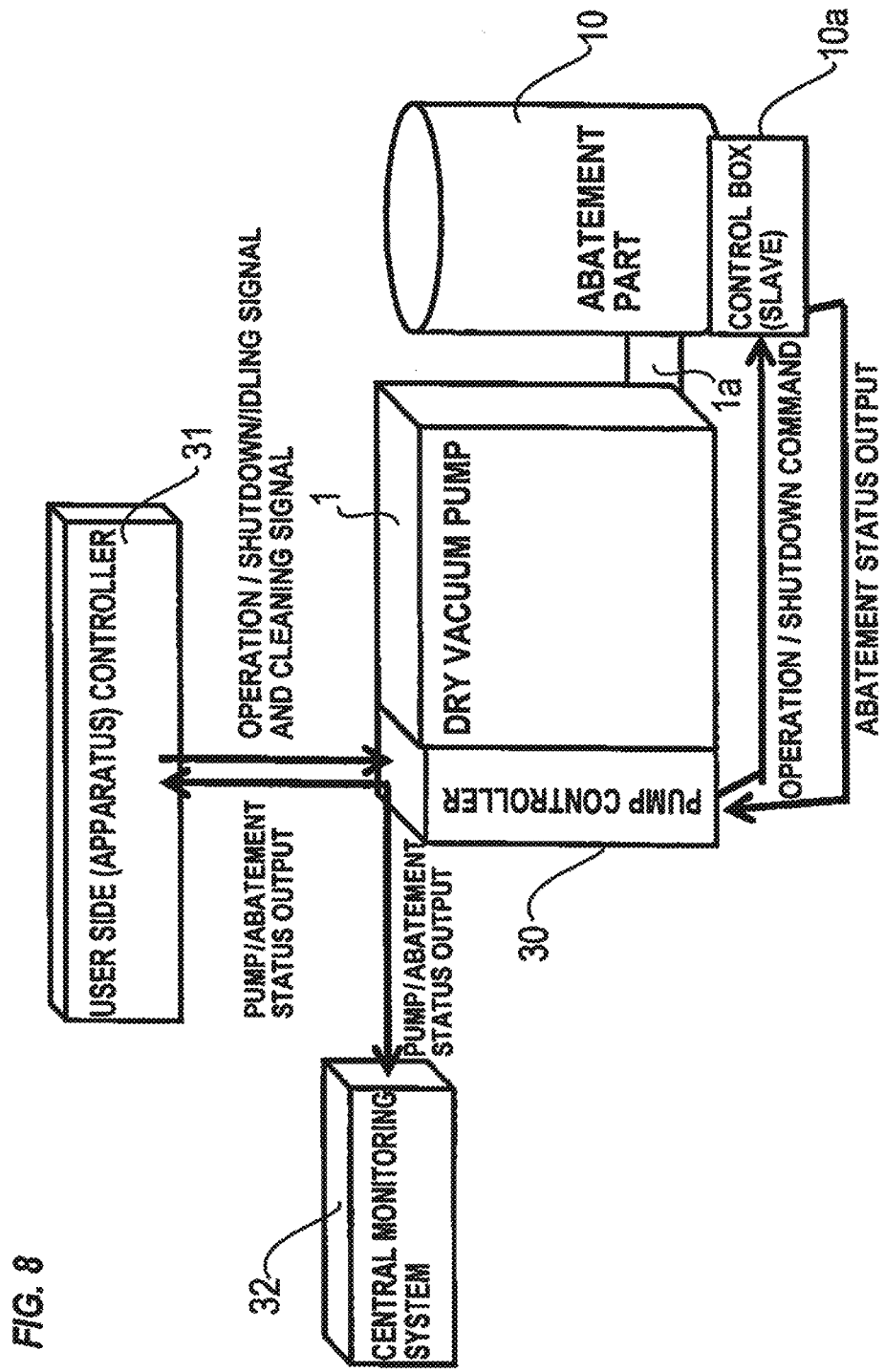
FIG. 8 is a schematic view showing a configuration of a controller of a vacuum pump with abatement function according to an embodiment.

FIG. 8 is a schematic view showing a configuration of a controller of a vacuum pump with abatement function according to the embodiment. As shown in FIG. 8, the vacuum pump with abatement function according to the embodiment has a configuration wherein an abatement part 10 is attached to a discharge pipe 1a of a vacuum pump 1, and a pump controller 30 is provided in the vacuum pump 1. The pump controller 30 is capable of sending and receiving signals, via communication lines and the like, to and from a controller 31 provided in a manufacturing apparatus or the like. Further, the pump controller 30 outputs status signals of the vacuum pump 1 and the abatement part 10 to a central monitoring system 32. The pump controller 30 is configured to collectively control the vacuum pump 1 and the abatement part 10 so that a portion of signal input/output of the pump is connected to the abatement part 10, and operation control and status monitoring of the abatement part 10 are performed by the pump controller 30. Specifically, the pump controller 30 is configured to output operation/shutdown signals to a control box 10a of the abatement part 10, and the control box 10a is configured to output the status signals of the abatement part 10 to the pump controller 30. The pump can be operated by a remote operation, local operation and COM operation. Since a main breaker is provided on a control panel of the vacuum pump 1, only the minimum necessary electric components are sufficient for the abatement part 10.

When an operation signal of the vacuum pump 1 is outputted from the pump controller 30, an operation signal of the abatement part 10 is outputted simultaneously from the pump controller 30 to the abatement part 10, thereby starting the operation of the abatement part 10. In the case where the abatement part 10 comprises a combustion-type abatement part, ignition of a pilot burner is started. While the vacuum pump 1 is in idling operation, the operation of the abatement part 10 is stopped. In the pump controller 30, setting of operational timing in the abatement part 10 can be changed.

As shown in FIG. 8, since the pump controller 30 is configured to collectively control the vacuum pump 1 and the abatement part 10, it is not necessary to prepare interfaces from the manufacturing apparatus respectively for the vacuum pump and for the exhaust gas treatment apparatus unlike conventional manner. Further, the abatement part 10 is comprised of the minimum necessary electric components.

Furthermore, since a main port for signals is provided in the vacuum pump 1, the control of the apparatus side or the factory side can be simplified.

The kind and the number of the abatement parts 10 is determined depending on the kind and amount of the gas. The abatement part 10 and the pump controller 30 are connected to each other, and thus the pump controller 30 can automatically recognize the kind and the number of the abatement parts 10. The pump controller 30 can individually determine the kind and the number of the abatement pans 10.

Since the pump controller 30 controls the abatement part 10 in accordance with the operation status of the vacuum pump 1, synchronous operation and safe operation, in accordance with the use conditions and use environment, of the abatement part and the vacuum pump can be realized.

The operation mode of the abatement part 10 can be optimized in accordance with the use status of the vacuum pump 1. The user does not need to construct control sequences of the abatement part 10. At the time of installation of the abatement part 10, wiring work is not necessary, thereby reducing man-hours.

In the case where the abatement part 10 comprises a combustion-type abatement part, according to the kind of process gas used in each step, the flow rate of a fuel or an oxidizing agent may be adjusted during the process to change a combustion mode. Conventionally, signals are inputted from the apparatus or the utility facility to the abatement part to change the mode. In an embodiment, signals are inputted to the controller of the dry pump to change the combustion mode of the abatement part 10.

Further, signals for the abatement part 10 can be utilized in the vacuum pump 1. For example, in the case of the combustion abatement, in order to treat a cleaning gas such as $Cl_2$, the fuel and oxygen generally need to be increased to decompose the gas in a high temperature state. In some cases, a treatment signal for the cleaning gas treatment is separately outputted. However, since the interfaces are integrated into the controller of the vacuum pump, the treatment signal can be utilized as an increase signal of $N_2$ for dilution, as collusion countermeasure of pump parts. Accordingly, a lifetime of the vacuum pump can be prolonged.

Since the status of the abatement part 10 is displayed on a status monitoring device of the vacuum pump 1, the operation can be performed easily. The collective control can be performed based on only the status displayed on the master vacuum pump 1, and abnormalities of the abatement part and the pump can be collectively monitored by the user.

Further, since the consolidated information of the vacuum pump 1 and the abatement part 10 can be collected, the status of the vacuum pump 1 and the abatement part 10 at the time of trouble can be grasped, and thus the trouble can be analyzed easily and the time necessary for coping with the trouble and the improvement can be shortened.

In the case where the abatement part 10 of the embodiment is connected to an existing exhaust system equipped with a vacuum pump, in the case where the abatement part 10 of the embodiment is brought to the market in which a vacuum pump is not necessary, or in other cases, the abatement part 10 needs to be controlled alone, thus requiring a controller for dedicatedly controlling the abatement part 10.

Figure 9:
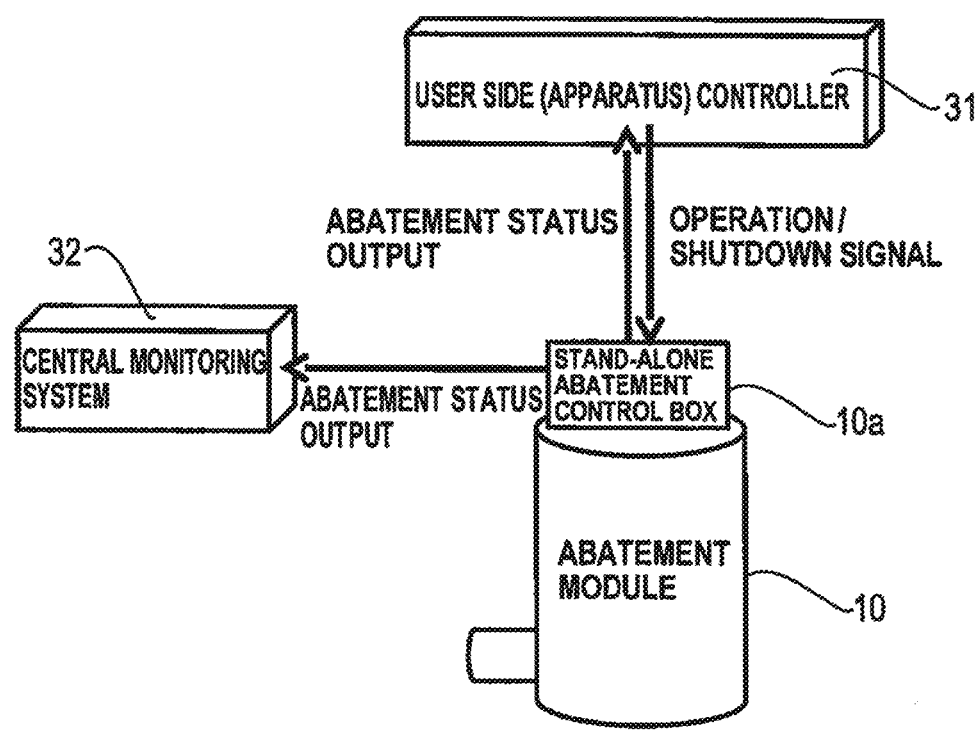
FIG. 9 is a schematic view showing a configuration of a controller provided on an abatement part for dedicatedly controlling the abatement part.

FIG. 9 is a schematic view showing a configuration of a controller provided on an abatement part 10 for dedicatedly controlling the abatement part 10. As shown in FIG. 9, the abatement part 10 has a control box 10a. The control box 10a is capable of sending and receiving signals, via communication lines and the like, to and from a controller 31 provided in a manufacturing apparatus or the like. Further, the control box 10a outputs status signals of the abatement part 10 to a central monitoring system 32.

As shown in FIG. 9, since the abatement part 10 has the control box 10a for controlling the entire abatement part 10, the stand-alone-type abatement part 10 can be constructed. The stand-alone-type abatement part 10 can be used in combination of a blower and the abatement part 10, or by the abatement part 10 itself. Therefore, the abatement part 10 can be used in the existing exhaust system equipped with the vacuum pump.

Figure 10:
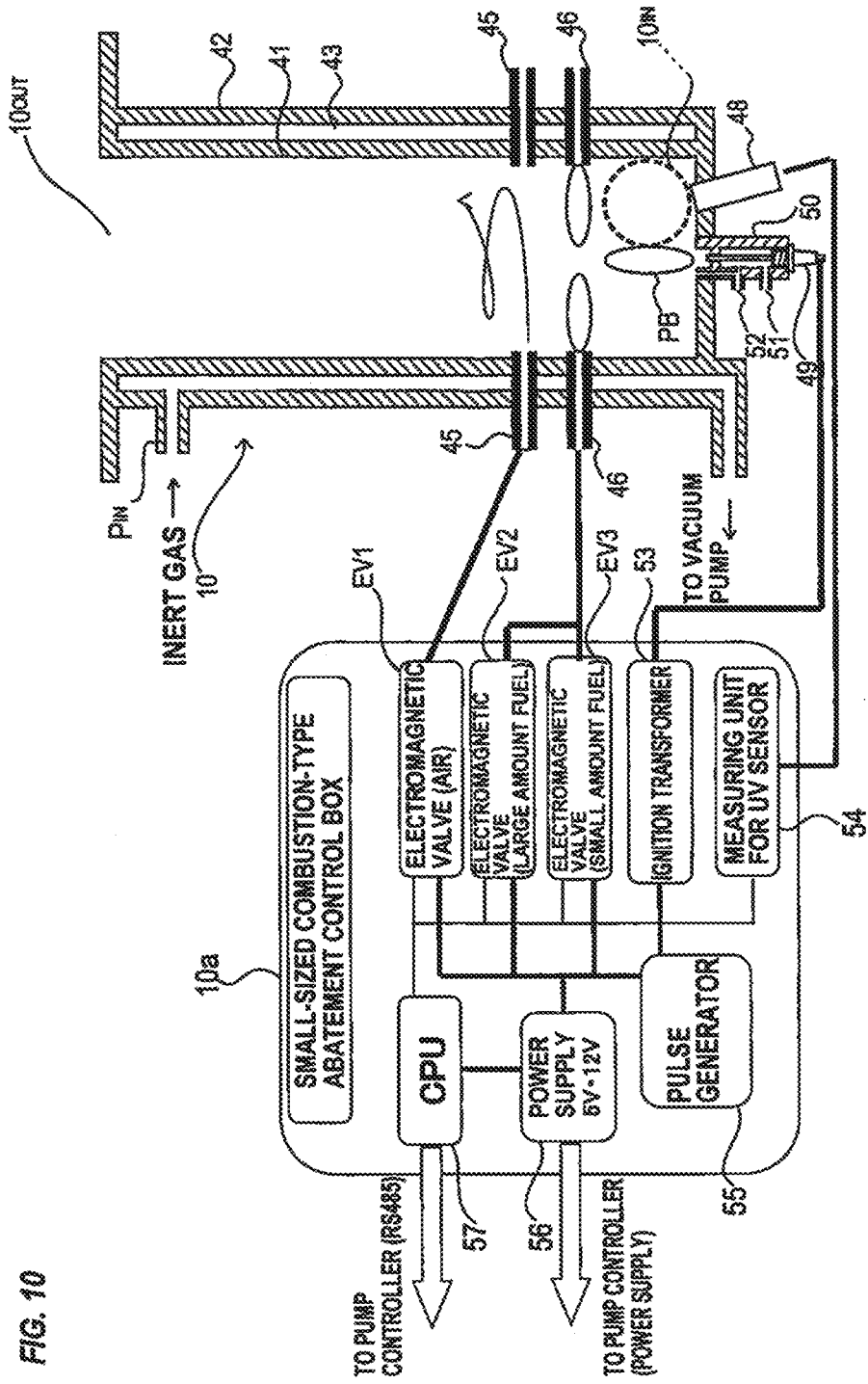
FIG. 10 is a schematic cross-sectional view showing a small-sized combustion-type abatement part suitable for the abatement part of the vacuum pump with abatement function of an embodiment.

FIG. 10 is a schematic cross-sectional view showing a small-sized combustion-type abatement part 10 suitable for the abatement part of the vacuum pump with abatement function according to the embodiment. As shown in FIG. 10, the abatement part 10 is composed of a cylindrical container as a whole. The cylindrical container-shaped abatement part 10 is disposed in a vertical direction so that its central axis extends in a vertical direction. The abatement part 10 comprises a cylindrical member 41 which has a bottom and forms a combustion chamber S therein for forming flames by a burner and combusting an exhaust gas, and an outer cylinder 42 provided so as to surround the cylindrical member 41 with a predetermined distance therebetween. A heating chamber 43 for holding and heating an inert gas such as an $N_2$ gas is formed between the cylindrical member 41 and the outer cylinder 42. The inert gas such as an $N_2$ gas flows into the heating chamber 43 from an inlet port $P_{IN}$ provided at an upper part of the outer cylinder 42 and is heated in the heating chamber 43, and flows out from an outlet port $P_{OUT}$ provided at a lower part of the outer cylinder 42. The heating chamber 43 having a double-pipe-structure constitutes a heat exchanger. The inert gas heated in the heating chamber 43 can be supplied to the vacuum pump 1. The inert gas is heated in the heating chamber 43 to a temperature which is substantially equal to an internal temperature of the vacuum pump 1, for example, to a temperature of 190° C. to 220° C.

As shown in FIG. 10, a gas introduction port $10_{IN}$ for introducing the exhaust gas to be treated into the combustion chamber is formed at a lower part of a circumferential wall of the abatement part 10. A gas outlet $10_{OUT}$ for discharging the gas after treatment is formed at the upper end of the abatement part 10. A plurality of air nozzles 45 for supplying air into the combustion chamber S and a plurality of fuel nozzles 46 for supplying a fuel into the combustion chamber S are provided in the abatement part 10. The air nozzles 45 extend at a predetermined angle to the tangential direction of the abatement part 10 to blow of air so as to form swirling flows along an inner circumferential surface of the circumferential wall of the cylindrical member 41. Similarly, the fuel nozzles 46 extend at a predetermined angle to the tangential direction of the cylindrical member 41 to blow off the fuel so as to form swirling flows along the inner circumferential surface of the circumferential wall of the cylindrical member 41. The air nozzles 45 and the fuel nozzles 46 are disposed respectively at predetermined intervals in the circumferential direction of the abatement part 10. A UV sensor 48 for detecting flames and a plug 49 for ignition are provided on the bottom of the cylindrical member 41.

A cylindrical pilot burner part 50 is provided so as to surround the plug 49. A fuel supply port 51 for supplying a fuel for forming a flame and an air supply port 52 for supplying semi-premixed air are formed in the pilot burner part 50. Thus, a pilot burner flame PB is formed by igniting the fuel supplied from the fuel supply port 51 with the plug 49.

The control box 10a of the abatement part 10 has electromagnetic valves EV1, EV2 and EV3, an ignition transformer 53 for the plug 49, a measuring unit 54 for the UV sensor 48, and a pulse generator 55. Further, the control box 10a has a power supply 56 and a CPU 57. The power supply 56 is connected to a pump controller 30 (see FIG. 8), and the CPU 57 is connected to the pump controller 30. The pump controller 30 and the interface means of the abatement part 10 are not limited to the power supply and communication (RS485).

Next, operation of the abatement part 10 shown in FIG. 10 will described.

The fuel is blown off from the plural fuel nozzles 46 provided in the abatement part 10 toward the combustion chamber S so as to form the swirling flows. Further, air is blown of from the plural air nozzles 45 toward the combustion chamber S so as to form the swirling flows. Then, the mixture gas of fuel and air is ignited by the pilot burner flame PB, and thus the swirling flows of flames (swirling flames) are formed along the inner circumferential surface of the cylindrical member 41.

On the other hand, the exhaust gas to be treated is blown of toward the combustion chamber S loom the exhaust gas introduction port $10_{IN}$ which opens on the inner circumferential surface of the cylindrical member 41. The blown-off exhaust gas mixes with the swirling flames of the mixture gas and is combusted. At this time, because the fuel is blown off from all the fuel nozzles 46 provided in the circumferential direction of the cylindrical member 41 so as to swirl intensely in one direction, combustion efficiency of the exhaust gas becomes high. Further, since the air ejected from the air nozzles 45 is also swirling, while the air flows mix with the flames to accelerate the swirling flows of the flames, the exhaust gas is oxidatively decomposed. The treated gas is discharged from the gas outlet $10_{OUT}$ at the upper end of the abatement part 10, and is then discharged to the exhaust duct.

According to the combustion-type abatement part shown in FIG. 10, combustion waste heat generated by abatement treatment of the exhaust gas is utilized to heat the inert gas such as an $N_2$ in the heating chamber 43 of the abatement part 10, and the heated inert gas is supplied to the vacuum pump 1. Therefore, purging of the vacuum pump 1 can be performed by the heated inert gas, and thus a product can be prevented from being attached to the interior of the vacuum pump 1. According to the embodiment, it is not necessary to install a dedicated heater for heating the inert gas, thus achieving energy saving.

In the case where the exhaust gas treatment is unnecessary and only dilution of the exhaust gas is necessary (for example, in the case where the consumption efficiency of the process gas in the chamber such as CVD is high, and component concentration of harmful gas in the exhaust from the dry pump is close to the allowable concentration), a system configuration wherein no abatement part is provided and $N_2$ or air for dilution is supplied from a blower enables system simplification and cost reduction.

Although the preferred embodiments of the present invention have been described above, it should be understood that the present invention is not limited to the above embodiments, but various changes and modifications may be made to the embodiments without departing from the scope of the appended claims.

What is claimed is:

1. A vacuum pump with abatement function comprising:
a vacuum pump having a discharge port on which one or more abatement parts for treating an exhaust gas discharged from the vacuum pump to make the exhaust gas harmless are directly attached;
wherein the one or more abatement parts are selected, depending on the amount and kind of the exhaust gas discharged from the vacuum pump, from plural kinds of abatement parts which have different treatment types of exhaust gas and/or different treatment amounts of exhaust gas;
wherein a common utility facility is configured to supply cooling water and an inert gas to the vacuum pump and the one or more abatement parts.

2. The vacuum pump with abatement function according to claim 1, wherein the vacuum pump comprises a single vacuum pump or a plurality of vacuum pumps connected in series and/or in parallel.

3. The vacuum pump with abatement function according to claim 1, wherein the one or more abatement parts comprise a single abatement part or a plurality of abatement parts connected in series and/or in parallel.

4. The vacuum pump with abatement function according to claim 1, wherein the inert gas is heated by using heat generated by the abatement treatment of the exhaust gas in the abatement part, and the heated inert gas is supplied to the vacuum pump.

5. The vacuum pump with abatement function according to claim 1, wherein the common utility facility is configured to supply fuel and air to the abatement part of a combustion-type.

6. The vacuum pump with abatement function according to claim 5, wherein the common utility facility is configured to supply the fuel from a portable cylinder.

7. The vacuum pump with abatement function according to claim 1, wherein the exhaust gas is treated by the one or more abatement parts, and then the treated gas is discharged directly to an exhaust duct located at an installation site of the vacuum pump with abatement function.

8. The vacuum pump with abatement function according to claim 1, wherein the exhaust gas is treated by the one or more abatement parts, and then the treated gas is discharged to a scrubber.

9. The vacuum pump with abatement function according to claim 1, wherein a controller configured to collectively control the vacuum pump and the abatement part is provided.

\* \* \* \* \*